(12) United States Patent
Templeman

(10) Patent No.: US 9,781,464 B2
(45) Date of Patent: *Oct. 3, 2017

(54) EPG REALIGNMENT

(71) Applicant: Echostar Technologies L.L.C., Englewood, CO (US)

(72) Inventor: Mark Templeman, Parker, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,868

(22) Filed: Apr. 18, 2016

(65) Prior Publication Data

US 2016/0234543 A1 Aug. 11, 2016

Related U.S. Application Data

(63) Continuation of application No. 14/589,090, filed on Jan. 5, 2015, now Pat. No. 9,349,412, which is a
(Continued)

(51) Int. Cl.
*H04N 21/45* (2011.01)
*H04N 21/4147* (2011.01)
(Continued)

(52) U.S. Cl.
CPC ....... *H04N 21/4147* (2013.01); *G11B 27/026* (2013.01); *G11B 27/28* (2013.01);
(Continued)

(58) Field of Classification Search
None
See application file for complete search history.

(56) References Cited

U.S. PATENT DOCUMENTS 4,706,121 A 11/1987 Young
4,723,246 A 2/1988 Weldon, Jr.
(Continued)

FOREIGN PATENT DOCUMENTS

CN 1595975 A 3/2005
CN 1615017 A 5/2005
(Continued)

OTHER PUBLICATIONS

International Search Report and Written Opinion of PCT/US2012/51992mailed Nov. 2, 2012, 15 pages.
(Continued)

*Primary Examiner* — Pankaj Kumar
*Assistant Examiner* — Charles N Hicks
(74) *Attorney, Agent, or Firm* — Kilpatrick Townsend & Stockton LLP

(57) ABSTRACT

Arrangements detailed may cause a television channel received via the tuner to be recorded for a period of time to create a channel-specific file. The channel-specific file may include multiple television programs. User input that requests playback of a first television program of the plurality of television programs from the channel-specific file may be received. A front-end adjustment time period for playback of the first television program may be determined. A start time from which playback commences in the channel-specific file may be at least partially based on the front-end adjustment time period and a scheduled start time of the television program.

20 Claims, 7 Drawing Sheets

Related U.S. Application Data continuation of application No. 13/797,173, filed on Mar. 12, 2013, now Pat. No. 8,997,153.

(60) Provisional application No. 61/611,483, filed on Mar. 15, 2012.

(51) Int. Cl.

| | | |
|---|---|---|
| *H04N 5/91* | (2006.01) | |
| *H04N 5/50* | (2006.01) | |
| *H04N 9/87* | (2006.01) | |
| *H04N 9/79* | (2006.01) | |
| *H04N 21/472* | (2011.01) | |
| *H04N 9/797* | (2006.01) | |
| *H04N 5/782* | (2006.01) | |
| *H04N 21/426* | (2011.01) | |
| *H04N 21/433* | (2011.01) | |
| *H04N 5/44* | (2011.01) | |
| *H04N 5/76* | (2006.01) | |
| *G11B 27/28* | (2006.01) | |
| *H04N 21/43* | (2011.01) | |
| *H04N 21/458* | (2011.01) | |
| *H04N 5/775* | (2006.01) | |
| *H04N 21/4335* | (2011.01) | |
| *H04N 21/475* | (2011.01) | |
| *G11B 27/026* | (2006.01) | |
| *H04N 21/242* | (2011.01) | |
| *H04N 21/83* | (2011.01) | |
| *H04N 21/262* | (2011.01) | |
| *H04N 21/84* | (2011.01) | |
| *H04N 21/482* | (2011.01) | |
| *H04N 7/20* | (2006.01) | |

(52) U.S. Cl.
CPC ............ *H04N 5/4401* (2013.01); *H04N 5/50* (2013.01); *H04N 5/76* (2013.01); *H04N 5/775* (2013.01); *H04N 5/782* (2013.01); *H04N 5/91* (2013.01); *H04N 9/79* (2013.01); *H04N 9/797* (2013.01); *H04N 9/87* (2013.01); *H04N 21/242* (2013.01); *H04N 21/262* (2013.01); *H04N 21/4263* (2013.01); *H04N 21/4302* (2013.01); *H04N 21/4334* (2013.01); *H04N 21/4335* (2013.01); *H04N 21/4532* (2013.01); *H04N 21/4583* (2013.01); *H04N 21/4755* (2013.01); *H04N 21/47202* (2013.01); *H04N 21/47214* (2013.01); *H04N 21/47217* (2013.01); *H04N 21/482* (2013.01); *H04N 21/4821* (2013.01); *H04N 21/83* (2013.01); *H04N 21/84* (2013.01); *H04N 7/20* (2013.01); *H04N 21/4826* (2013.01)

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,608,652 A | 3/1997 | Astle |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,351,474 B1 | 2/2002 | Robinett et al. |
| 6,453,115 B1 | 9/2002 | Boyle |
| 6,628,891 B1 | 9/2003 | Vantalon et al. |
| 6,687,296 B1 | 2/2004 | Sato et al. |
| 6,701,528 B1 | 3/2004 | Arsenault et al. |
| 6,728,883 B1 | 4/2004 | Kohashi et al. |
| 6,766,523 B2 | 7/2004 | Herley |
| 6,771,703 B1 | 8/2004 | Oguz et al. |
| 6,798,971 B2 | 9/2004 | Potrebic |
| 6,938,208 B2 | 8/2005 | Reichardt |
| 7,024,676 B1 | 4/2006 | Klopfenstein |
| 7,062,048 B2 | 6/2006 | Livaditis et al. |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,533,402 B2 | 5/2009 | Demas et al. |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,684,672 B2 | 3/2010 | Matoba et al. |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,043,843 B2 | 5/2015 | Templeman et al. |
| 9,055,274 B2 | 6/2015 | Casagrande |
| 9,088,763 B2 | 7/2015 | Martch et al. |
| 9,113,222 B2 | 8/2015 | VanDuyn |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 9,349,412 B2 * | 5/2016 | Templeman ........... H04N 5/782 |
| 9,350,937 B2 | 5/2016 | Kummer et al. |
| 9,357,159 B2 | 5/2016 | Martch et al. |
| 9,361,940 B2 | 6/2016 | Minnick |
| 9,412,413 B2 | 8/2016 | Martch |
| 9,489,981 B2 | 11/2016 | Templeman et al. |
| 9,489,982 B2 | 11/2016 | Casagrande et al. |
| 9,521,440 B2 | 12/2016 | Kummer et al. |
| 9,549,213 B2 | 1/2017 | Templeman et al. |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |

(56) References Cited

U.S. PATENT DOCUMENTS

| | | |
|---|---|---|
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0126221 A1 | 9/2002 | Link |
| 2002/0141431 A1 | 10/2002 | Tripathy |
| 2002/0144259 A1 | 10/2002 | Gutta et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihortri et al. |
| 2002/0188943 A1 | 12/2002 | Freeman et al. |
| 2003/0005454 A1 | 1/2003 | Rodriguez et al. |
| 2003/0026423 A1 | 2/2003 | Unger et al. |
| 2003/0078930 A1 | 4/2003 | Surcouf et al. |
| 2003/0097659 A1 | 5/2003 | Goldman |
| 2003/0110514 A1 | 6/2003 | West et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0148501 A1 | 7/2004 | Livaditis et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1 | 1/2005 | Putterman |
| 2005/0034171 A1 | 2/2005 | Benya |
| 2005/0071877 A1 | 3/2005 | Navarro |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0144646 A1 | 6/2005 | Lecrom et al. |
| 2005/0147383 A1 | 7/2005 | Ihara |
| 2005/0180568 A1 | 8/2005 | Krause |
| 2005/0229213 A1 | 10/2005 | Ellis et al. |
| 2005/0237435 A1 | 10/2005 | Potrebic et al. |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0078055 A1 | 4/2006 | Kanazawa |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow |
| 2007/0016546 A1 | 1/2007 | De Vorchik et al. |
| 2007/0019930 A1 | 1/2007 | Kim |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0158370 A1 | 6/2009 | Li et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |

(56) References Cited

U.S. PATENT DOCUMENTS

| | | |
|---|---|---|
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0008024 A1 | 1/2011 | Sasaki et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0106744 A1 | 5/2011 | Becker et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1 | 8/2012 | Eppolito et al. |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | VanDuyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0081098 A1 | 3/2013 | Klughart |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0115636 A1 | 4/2014 | Stuckman |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Potrebic et al. |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0105711 A1 | 4/2016 | Martch et al. |
| 2016/0134926 A1 | 5/2016 | Casagrande et al. |
| 2016/0198215 A1 | 7/2016 | Hardy |
| 2016/0249089 A1 | 8/2016 | Minnick |
| 2016/0323632 A1 | 11/2016 | Martch et al. |

FOREIGN PATENT DOCUMENTS

| | | |
|---|---|---|
| CN | 1926793 A | 3/2007 |
| CN | 101174946 A | 5/2008 |
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 2/2002 |
| EP | 1372399 A2 | 12/2003 |
| EP | 1 447 983 A1 | 8/2004 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 1 667 452 B1 | 11/2011 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |
| IN | 7408/CHENP/2014 A | 1/2016 |
| IN | 9493/CHEN/2013 A | 6/2016 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 7/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/081729 A1 | 7/2011 |
| WO | 2011/027236 A1 | 10/2011 |
| WO | 2012/003693 A1 | 1/2012 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138610 A1 | 9/2013 |
| WO | 2013/138638 A1 | 9/2013 |

(56) References Cited

FOREIGN PATENT DOCUMENTS

| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2015/065934 mailed Apr. 8, 2016, all pages.
International Search Report and Written Opinion of PCT/EP2015/073937 mailed Apr. 15, 2016, all pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
Office Action for EP 13 192 169.4 dated Mar. 29, 2016, all pages.
U.S. Appl. No. 13/786,915, filed Mar. 6, 2013, Non Final Rejection mailed Oct. 15, 2015, 59 pages.
U.S. Appl. No. 13/786,915, filed Mar. 6, 2013, Final Rejection mailed May 12, 2016, 27 pages.
U.S. Appl. No. 13/786,915, filed Mar. 6, 2013, Notice of Allowance mailed Jul. 19, 2016, all pages.
U.S. Appl. No. 14/757,606, filed Dec. 23, 2015, Non Final Rejection mailed Mar. 24, 2016, 33 pages.
U.S. Appl. No. 14/757,606, filed Dec. 23, 2015, Notice of Allowance mailed Jul. 18, 2016, all pages.
U.S. Appl. No. 14/340,190, filed Jul. 24, 2014, Non-Final Rejection mailed Aug. 31, 2015, 74 pages.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Non-Final Rejection mailed Jul. 17, 2015, 33 pages.
U.S. Appl. No. 14/154,887, filed Jan. 14, 2014 Notice of Allowance mailed Jan. 21, 2016, 26 pages.
U.S. Appl. No. 14/467,959, filed Aug. 25, 2014 Notice of Allowance mailed Jun. 22, 2015, 36 pages.
U.S. Appl. No. 13/888,012, filed May 6, 2013 Non-Final Rejection mailed Apr. 6, 2015, 36 pages.
U.S. Appl. No. 13/888,012, filed May 6, 2013 Notice of Allowance mailed Jul. 14, 2015, 18 pages.
U.S. Appl. No. 13/856,752, filed Apr. 4, 2013 Non Final Office Action mailed Nov. 5, 2014, 34 pages.
U.S. Appl. No. 13/856,752, filed Apr. 4, 2013 Notice of Allowance mailed Feb. 10, 2015, 20 pages.
U.S. Appl. No. 13/757,168, filed Feb. 1, 2013 Notice of Allowance mailed Oct. 14, 2014, 28 pages.
U.S. Appl. No. 13/757,168, filed Feb. 1, 2013, Non Final Office Action mailed Jun. 4, 2014, 23 pages.
U.S. Appl. No. 13/799,604, filed Mar. 13, 2013, Notice of Allowance mailed Jul. 24, 2015, 34 pages.
U.S. Appl. No. 13/799,604, filed Mar. 13, 2013, Notice of Allowance mailed May 29, 2015, 46 pages.
U.S. Appl. No. 13/799,604, filed Mar. 13, 2013, Final Office Action mailed Jan. 14, 2015, 36 pages.
U.S. Appl. No. 13/799,604, filed Mar. 13, 2013, Non Final Office Action mailed Jun. 6, 2014, 24 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/288,002, filed Nov. 2, 2011 Non Final Rejection mailed Jul. 28, 2015, 29 pages.
U.S. Appl. No. 13/288,002, filed Nov. 2, 2011 Final Rejection mailed Jan. 13, 2016, 22 pages.
U.S. Appl. No. 13/302,852, filed Nov. 22, 2011 Non-Final Rejection mailed May 23, 2013, 19 pages.
U.S. Appl. No. 13/302,852, filed Nov. 22, 2011, Notice of Allowance mailed Jun. 19, 2015, 26 pages.
U.S. Appl. No. 13/302,852, filed Nov. 22, 2011, Final Rejection mailed Dec. 9, 2013, 23 pages.
U.S. Appl. No. 13/302,852, filed Nov. 22, 2011, Non-Final Rejection mailed Sep. 2, 2014, 28 pages.
U.S. Appl. No. 13/302,852, filed Nov. 22, 2011, Final Rejection mailed Mar. 30, 2015, 29 pages.
The Notice of Allowance by the Mexican Institute of Industrial Property for Mexican Patent Application No. MX/a/2013/014907 dated Feb. 20, 2015 is not translated into English, 1 page.
U.S. Appl. No. 13/324,831, filed Dec. 13, 2011, Non-Final Office Action mailed Feb. 28, 2013, 23 pages.
U.S. Appl. No. 13/324,831 filed Dec. 13, 2011, Notice of Allowance mailed Sep. 4, 2013, 22 pages.
U.S. Appl. No. 13/292,047, filed Nov. 8, 2011, Non-Final Office Action mailed Jan. 18, 2013, 17 pages.
U.S. Appl. No. 13/292,047, filed Nov. 8, 2011, Final Office Action mailed Aug. 19, 2013, 17 pages.
U.S. Appl. No. 13/292,047, filed Nov. 8, 2011 Final Office Action mailed Jan. 13, 2015, 22 pages.
U.S. Appl. No. 13/292,047, filed Nov. 8, 2011 Non Final Office Action mailed Jul. 7, 2015, 28 pages.
U.S. Appl. No. 13/292,047, filed Nov. 8, 2011 Notice of Allowance mailed Jan. 29, 2016, 45 pages.
U.S. Appl. No. 13/614,899, filed Sep. 13, 2012, Non-Final Office Action mailed Feb. 5, 2013, 17 pages.

(56) References Cited

OTHER PUBLICATIONS

U.S. Appl. No. 13/614,899, filed Sep. 13, 2012, Non-Final Office Action mailed May 20, 2014, 25 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/614,899, filed Sep. 13, 2012, Notice of Allowance mailed Mar. 13, 2015, 35 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,598, filed Aug. 23, 2011 Non-Final Office Action mailed Nov. 25, 2014, 18 pages.
U.S. Appl. No. 13/215,598, filed Aug. 23, 2011 Final Office Action mailed Jul. 2, 2014, 22 pages.
U.S. Appl. No. 13/215,598, filed Aug. 23, 2011 Final Office Action mailed May 5, 2015, 17 pages.
U.S. Appl. No. 13/215,598, filed Aug. 23, 2011 Non Final Office Action mailed Dec. 15, 2015, all pages.
U.S. Appl. No. 13/215,598, filed Aug. 23, 2011 Notice of Allowance mailed May 24, 2016, all pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011 Notice of Allowance mailed Oct. 31, 2014, 24 pages.
U.S. Appl. No. 13/294,005, filed Nov. 11, 2011 Non-Final Office Action mailed May 20, 2014, 33 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013 Notice of Allowance mailed Nov. 24, 2014, 37 pages.
U.S. Appl. No. 13/797,173, filed Mar. 12, 2013 Notice of Allowance mailed Feb. 26, 2015, 19 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013 Notice of Allowance mailed Nov. 26, 2014, 32 pages.
U.S. Appl. No. 13/799,653, filed Mar. 13, 2013, Non Final Office Action mailed May 8, 2014, 24 pages.
U.S. Appl. No. 13/801,968, filed Mar. 13, 2013 Non Final Office Action mailed May 21, 2015, 49 pages.
U.S. Appl. No. 13/801,968, filed Mar. 13, 2013 Final Office Action mailed Nov. 19, 2015, all pages.
U.S. Appl. No. 13/801,968, filed Mar. 13, 2013 Notice of Allowance mailed Apr. 7, 2016, 33 pages.
U.S. Appl. No. 13/829,350, filed Mar. 14, 2013, Non Final Office Action mailed Feb. 28, 2014, 29 pages.
U.S. Appl. No. 13/829,350, filed Mar. 14, 2013 Non Final Office Action mailed Jul. 29, 2014, 24 pages.
U.S. Appl. No. 13/829,350, filed Mar. 14, 2013 Final Office Action mailed Jan. 23, 2015, 18 pages.
U.S. Appl. No. 13/829,350, filed Mar. 14, 2013 Notice of Allowance mailed Jul. 24, 2015, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 13/801,994, Non Final Office Action mailed Oct. 7, 2015, 55 pages.
U.S. Appl. No. 13/801,994, Final Office Action mailed May 4, 2016, 37 pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/591,549, Final Office Action mailed Jun. 30, 2016, all pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 14/060,388, filed Oct. 22, 2013, Notice of Allowance mailed Apr. 13, 2015, 44 pages.
U.S. Appl. No. 13/793,636, filed Mar. 11, 2013, Non-Final Office Action mailed Sep. 29, 2014, 27 pages.
U.S. Appl. No. 13/793,636, filed Mar. 11, 2013, Notice of Allowance mailed Jan. 28, 2015, 43 pages.
International Search Report of PCT/KR2007/003521 mailed on Oct. 23, 2007, 22 pages.
International Search Report of PCT/IB2003/005737 mailed on Mar. 2, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> Chapter: "How a disk works", Section: "The original problem". Retrieved on Jan. 9, 2014, 70 pages.
U.S. Appl. No. 14/095,860, filed Dec. 3, 2013 Non-Final Office Action mailed Dec. 26, 2014, 45 pages.
U.S. Appl. No. 14/095,860, filed Dec. 3, 2013 Final Office Action mailed May 1, 2015, 18 pages.
U.S. Appl. No. 14/095,860, filed Dec. 3, 2013 Notice of Allowance mailed Jul. 13, 2015, 31 pages.
U.S. Appl. No. 14/095,860, filed Dec. 3, 2013 Notice of Allowance mailed Oct. 19, 2015, 14 pages.
U.S. Appl. No. 14/338,114, filed Jul. 22, 2014 Non-Final Office Action mailed Sep. 30, 2015, all pages.
U.S. Appl. No. 14/338,114, filed Jul. 22, 2014 Notice of Allowance mailed Feb. 3, 2016, all pages.
U.S. Appl. No. 14/529,989, filed Oct. 31, 2014 Non-Final Office Action mailed Nov. 4, 2015, all pages.
U.S. Appl. No. 14/529,989, filed Oct. 31, 2014, Final Rejection mailed May 6, 2016, 27 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 13/795,914, filed Mar. 6, 2013, Non-Final Office Action mailed Oct. 11, 2013, 17 pages.
U.S. Appl. No. 13/800,477, filed Mar. 13, 2013 Non-Final Office Action mailed Sep. 11, 2014, 34 pages.
U.S. Appl. No. 13/800,477, filed Mar. 13, 2013 Notice of Allowance mailed Feb. 18, 2015, 18 pages.
U.S. Appl. No. 14/043,617, filed Oct. 1, 2013 Non-Final Office Action mailed Jan. 5, 2015, 45 pages.
U.S. Appl. No. 14/043,617, filed Oct. 1, 2013 Final Office Action mailed Jul. 16, 2015, 45 pages.
U.S. Appl. No. 14/043,617, filed Oct. 1, 2013, Final Office Action mailed May 6, 2016, 56 pages.
U.S. Appl. No. 14/043,617, filed Oct. 1, 2013 Non-Final Office Action mailed Oct. 23, 2015, all pages.
U.S. Appl. No. 14/676,137, filed Apr. 1, 2015 Notice of Allowance mailed Sep. 28, 2015, 35 pages.
International Preliminary Report on Patentability for PCT/US2013/032176 mailed Sep. 25, 2014, 7 pages.

(56) References Cited

OTHER PUBLICATIONS

International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
International Search Report and Written Opinion of PCT/US2013/031915 mailed on Jun. 3, 2013, 7 pages.
International Search Report and Written Opinion of PCT/US2013/031440 mailed May 30, 2013, 14 pages.
European Search Report for EP 12825653 dated Mar. 11, 2015, 7 pages.
Extended European Search Report for EP 12825080 mailed Sep. 11, 2014, 10 pages.
Extended European Search Report for EP 12825521 mailed Nov. 24, 2014, 7 pages.
Extended European Search Report for EP 12825474 mailed Jan. 7, 2015, 6 pages.
Extended European Search Report for EP 12825430 mailed Feb. 3, 2015, 9 pages.
Supplementary European Search Report for Application No. EP 12825147 dated Mar. 27, 2015, 9 pages.
Office Action for European Application No. 12825147 dated Mar. 7, 2016, all pages.
Supplementary European Search Report for EP 13761291.7 mailed Jul. 9, 2015, 8 pages.
Supplementary European Search Report for EP 13760902 mailed Oct. 20, 2015, all pages.
Supplementary European Search Report for EP 13761427 mailed Oct. 19, 2015, all pages.
Extended European Search Report for EP 13760237.1 received Jul. 21, 2015, 8 pages.
International Preliminary Report on Patentability for PCT/US2013/031440 mailed Sep. 25, 2014, 8 pages.
First Office Action and Search Report from the State Intellectual Property Office (SIPO) for CN 201280031434.7, issued Jul. 17, 2015, 12 pages.
Decision to Grant from the State Intellectual Property Office (SIPO) for CN 201280031434.7, issued May 12, 2016, all pages.
Second Office Action for CN 201280031434.7, issued Dec. 23, 2015, 6 pages.
First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
The second Office Action dated Feb. 26, 2015 for Mexican Pat. Appln. No. MX/a/2013/014217 is not translated into English, 3 pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
The Notice of Allowance by the Mexican Institute of Industrial Property for Mexican Patent Application No. MX/a/2013/014671 dated Apr. 17, 2015, 1 page.
The Office Action dated Nov. 6, 2014 for Mexican Patent Application No. MX/a/2013/014677 is not translated into English, 2 pages.
The Notice of Allowance by the Mexican Institute of Industrial Property for Mexican Patent Application No. MX/a/2013/014677 dated Mar. 19, 2015 is not translated into English, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
Notice of Allowance mailed Dec. 4, 2015 for Mexican Patent Application No. MX/a/2014/009723, 1 page.
Office Action dated Jul. 31, 2015 for Mexican Patent Application No. MX/a/2014/009928, 2 pages.
Notice of Allowance dated Jan. 15, 2016 for Mexican Patent Application No. MX/a/2014/009928, 1 page.
Office Action dated Jul. 31, 2015 for Mexican Patent Application No. MX/a/2014/009919, 2 pages.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Notice of Allowance dated Dec. 16, 2015 for Mexican Patent Application No. MX/a/2014/009919, 1 page.
Author Unknown, "Digital Video Broadcasting (DVB); Specification for Service Information (SI) in DVB systems," ETSI EN 300 468 V1.1 (Jan. 2013), 172 pages.
Author Unknown, Digital Video Broadcasting (DVB); Content Protection and Copy Management (DVD-CPCM); Part 3: CPCM Usage State Information; European Broadcasting Union Union Europa de Radio-Television, ETSI TS 102 825-3 V1.1.1 (Jul. 2008), XP014042034, 28 pages.
Author Unknown, "EE Launches home TV service in UK," dated Oct. 8, 2014, 3 pages. Retrieved on Oct. 13, 2014 from http://www.bbc.com/news/technology-29535279 (added to matrix Oct. 13, 2014, per Karam's email).
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
Author Unknown, "EE TV It's simply great television," Accessed on Oct. 13, 2014, 11 pages. Retrieved from https//ee.co.uk/ee-and-me/ee-tv.
Hee-Yong Kim et al., "DCT Domain Filter for ATV Down Conversion", Consumer Electronics, 1997. Digest of Technical Papers. ICCE., International Conference ON, IEEE, Jun. 11, 1997, pp. 142-143, XP032381904, DOI: 10.1109/ICCE. 1997.625904, ISBN: 978-0-7803-3734-3.
U.S. Appl. No. 14/340,190, filed Jul. 24, 2014, Notice of Allowance mailed Aug. 22, 2016, all pages.
U.S. Appl. No. 14/591,549, Non Final Office Action mailed Dec. 14, 2016, all pages.
U.S. Appl. No. 14/695,188 Non Final Office Action mailed Dec. 30, 2016, all pages.
U.S. Appl. No. 14/043,617, filed Oct. 1, 2013, Non-Final Office Action mailed Sep. 29, 2016, all pages.
U.S. Appl. No. 14/043,617, filed Oct. 1, 2013, Notice of Allowance mailed Dec. 23, 2016, all pages.
Notice of Publication for BR 11 2013 032035-4 dated Dec. 20, 2016, 1 page.
Notice of Publication for BR 11 2013 032380-9 dated Jan. 3, 2017, 1 page.
Notice of Publication for BR 11 2013 032377-9 dated Jan. 3, 2017, 1 page.
First Office Action and Search Report for CN Appln No. 201380014409.2 issued on Oct. 9, 2016, all pages.
Office Action mailed Nov. 29, 2016 for EP 13 761 291.7, all pages.
Evans, Brent: "GeekTonic: Jan. 25, 2009-Feb. 1, 2009", Jan. 31, 2009, SP55322053. 26 pages. Retreived from the Internet: URL: http://www.geektonic.com/2009_01_25_archive.html [retrieved on Nov. 23, 2016].
First Office Action and Search Report from the State Intellectual Property Office (SIPO) for CN 201280031150.8, issued Aug. 3, 2016, 10 pages.
Second Office Action issued by State Intellectual Property Office for CN 201280028697.2, issued Jul. 8, 2016, all pages.
First Office Action and Search Report for CN Appln No. 201280030476.9 issued Aug. 9, 2016, all pages.
Notice of Allowance mailed Jul. 21, 2016 for Mexican Patent Application No. MX/a/2015/10334, 1 page.

(56) References Cited

OTHER PUBLICATIONS

U.S. Appl. No. 14/860,366, Non-Final Office Action mailed Mar. 24, 2017, all pages.
U.S. Appl. No. 14/944,758, Non-Final Office Action mailed Jan. 25, 2017, all pages.
U.S. Appl. No. 15/141,304, Non-Final Office Action mailed Feb. 28, 2017, all pages.
Notice of Publication for BR 11 2013 032860-6 dated Jan. 24, 2017, 1 page.
Office Action for European Application No. 12825147 dated Aug. 23, 2016, all pages.

* cited by examiner

EPG REALIGNMENT

CROSS-REFERENCES TO RELATED APPLICATIONS

This application is a continuation of U.S. patent application Ser. No. 14/589,090, filed Jan. 5, 2015, entitled "EPG REALIGNMENT," which is a continuation of U.S. patent application Ser. No. 13/797,173, filed Mar. 12, 2013, entitled "EPG REALIGNMENT," which claims priority to U.S. provisional application 61/611,483, filed Mar. 15, 2012, entitled "Reception, Recording, Storage, and Manipulation of Multiple Television Channels," the entire disclosure of which is hereby incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers.

SUMMARY

In some embodiments, a system for adjusting playback of television programming may be presented. The system may include a tuner. The system may include one or more processors. The system may include a memory communicatively coupled with and readable by the one or more processors and having stored therein processor-readable instructions. When executed by the one or more processors, the instructions may cause the one or more processors to cause a television channel, received via the tuner, to be recorded for a period of time to create a channel-specific file. The channel-specific file may include at least a first television program and a second television program. The first television program may correspond with a first broadcast time slot. The second television program may correspond with a second broadcast time slot. The instructions may cause the one or more processors to process received user input that requests playback of the second television program of the plurality of television programs from the channel-specific file. The instructions may cause the one or more processors to determine a front-end adjustment time period for playback of the second television program, wherein the front-end adjustment corresponds with a portion of content recorded during the first broadcast time slot. The instructions may cause the one or more processors to cause playback of the second television program to commence. A start time in which playback commences in the channel-specific file is at least partially based on the front-end adjustment time period and a scheduled start time of the television program in the second broadcast time slot. The instructions may cause the one or more processors to cause output of electronic programming guide information regarding the second program during playback of the portion of content recorded during the first broadcast time slot.

In some embodiments, a system for adjusting playback of television programming is presented. The system may include a tuner. The system may include one or more processors. The system may include a memory communicatively coupled with and readable by the one or more processors and having stored therein processor-readable instructions. When executed by the one or more processors, the instructions may cause the one or more processors to cause a television channel received via the tuner to be recorded for a period of time to create a channel-specific file. The channel-specific file may include a plurality of television programs. The instructions may cause the one or more processors to process received user input that requests playback of a first television program of the plurality of television programs from the channel-specific file. The instructions may cause the one or more processors to determine a front-end adjustment time period for playback of the first television program. The instructions may cause the one or more processors to cause playback of the first television program to commence wherein a start time from which playback commences in the channel-specific file is at least partially based on the front-end adjustment time period and a scheduled start time of the television program.

Embodiments of such a system may include one or more of the following: The instructions may cause the one or more processors to cause electronic programming guide information about the first television program to be output for display during the front-end adjustment time period. The electronic programming guide information may be presented based on selection of the first television program of the plurality of television programs from the channel-specific file. The instructions may cause the one or more processors to process an indication of a length of time to use as the front-end adjustment time period received by the tuner. The instructions may cause the one or more processors to process an indication of a length of time to use as the front-end adjustment time period received via a user interface. The front-end adjustment time period may be between two and four or one and five minutes in length. The instructions may cause the one or more processors to determine a back-end adjustment time period for playback of the first television program. The instructions may cause the one or more processors to cause playback of the first television program to end wherein an end time at which playback ends in the channel-specific file is at least partially based on the back-end adjustment time period and a scheduled end time of the television program.

Additionally or alternatively, embodiments of such a system may include one or more of the following: The instructions may cause the one or more processors to cause electronic programming guide information about the first television program to be output for display during the back-end adjustment time period. The electronic programming guide information may be based on selection of the first television program of the plurality of television programs from the channel-specific file. The instructions may cause the one or more processors to process user-input received during the back-end adjustment time period. The processor-readable instructions may be configured to cause the one or more processors to cause electronic programming guide information about the first television program to be output for display during the back-end adjustment time period occur in response to the user-input. The instructions may cause the one or more processors to process an indication of a start time for the first television program received via the tuner. The front-end adjustment period may be based on the indication. The instructions may cause the one or more processors to receive a channel-specific value to use for a length of the front-end adjustment period, wherein the channel-specific value is based on a historical analysis of television program start times of the television channel conducted by a television service provider.

In some embodiments, a method for adjusting playback of television programming. The method may include recording a television channel via a tuner for a period of time to create a channel-specific file. The channel-specific file may include a plurality of television programs. The method may include processing received user input that requests playback of a first television program of the plurality of television programs from the channel-specific file. The method may include determining a front-end adjustment time period for playback of the first television program. The method may include commencing playback of the first television program. A start time from which playback commences in the channel-specific file may be at least partially based on the front-end adjustment time period and a scheduled start time of the television program. The method may include outputting electronic programming guide information about the first television program for display during the front-end adjustment time period. The electronic programming guide information may be presented based on selection of the first television program of the plurality of television programs from the channel-specific file. The method may include processing an indication of a length of time to use as the front-end adjustment time period received by the tuner. The method may include processing an indication of a length of time to use as the front-end adjustment time period received via the user interface. The front-end adjustment time period may be between two and four or one and five minutes in length. The method may include determining a back-end adjustment time period for playback of the first television program. The method may include causing playback of the first television program to end wherein an end time at which playback ends in the channel-specific file is at least partially based on the back-end adjustment time period and a scheduled end time of the television program. The method may include outputting electronic programming guide information about the first television program for display during the back-end adjustment time period. The electronic programming guide information may be based on selection of the first television program of the plurality of television programs from the channel-specific file.

The method may include processing user-input received during the back-end adjustment time period. Electronic programming guide information about the first television program may be output for display during the back-end adjustment time period occur in response to the user-input. The method may include processing an indication of a start time for the first television program received via the tuner. The front-end adjustment period may be based on the indication. The method may include receive a channel-specific value to use for a length of the front-end adjustment period, wherein the channel-specific value is based on a historical analysis of television program start times of the television channel conducted by a television service provider.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
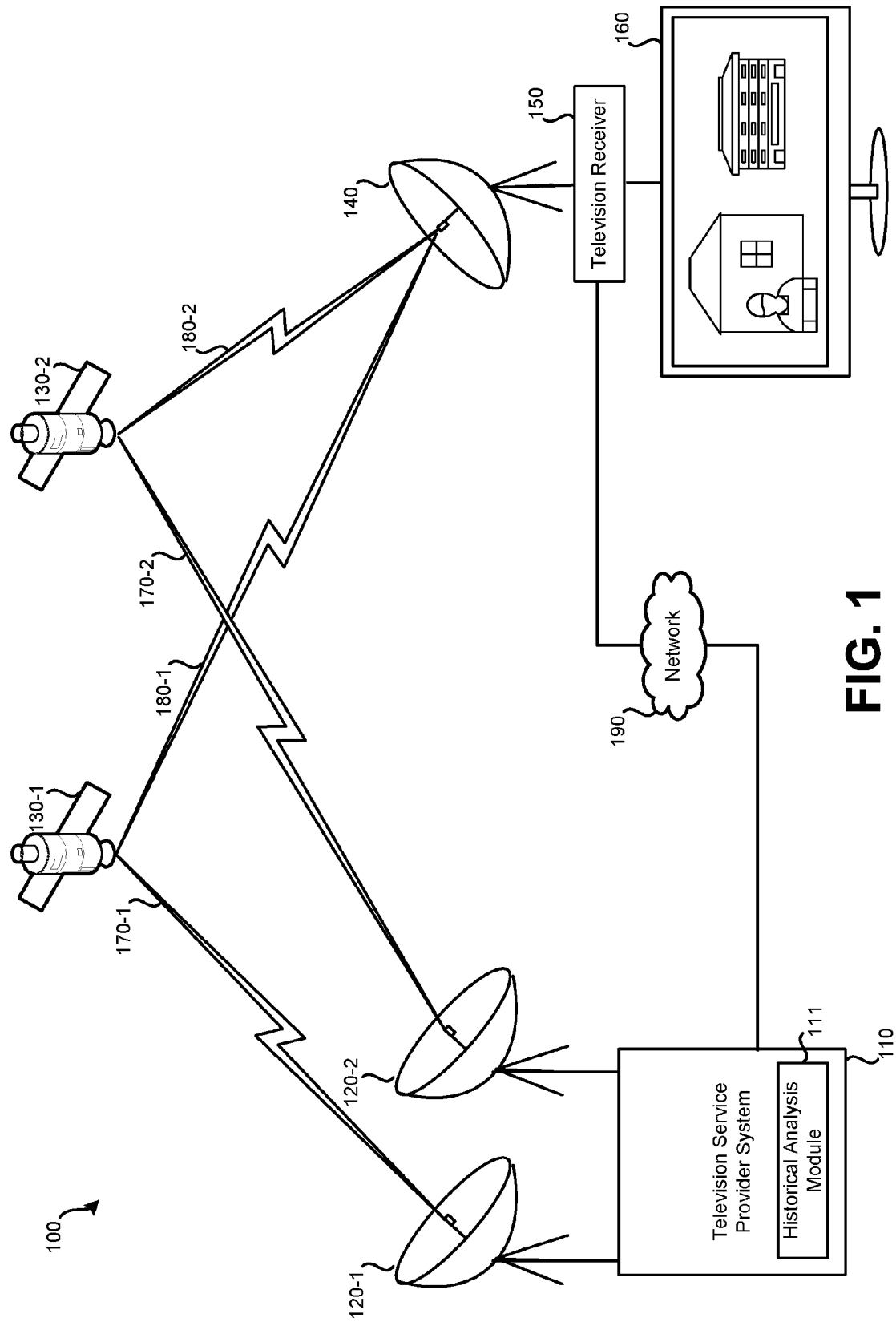
FIG. 1 illustrates an embodiment of a satellite television distribution system.

Recording of television programming using a digital video recorder (DVR) may be performed based on scheduled programming times. An electronic programming guide (EPG) may indicate the channel, date, and time period during which a television program is scheduled to be broadcast. If the television program is to be recorded, a timer may be set by the DVR based on the start of the scheduled time period and the end of the scheduled time period for the television channel on which the television program is to be broadcast. While the television program may be scheduled for such a time period (e.g., 8:00 PM-8:30 PM), television channels are often early or late with the start and/or end of the broadcast of television programs. For example, if a television program is scheduled to begin at 8:00 PM, it may be common for the television program to actually start broadcast in the range of 7:58 PM to 8:02 PM. As such, if a DVR timer is set for recording precisely on the scheduled start time and end time, a portion of the television program may be lost at either the beginning or end of the recording. Such a loss may be especially annoying to a television viewer because the television viewer may miss how a television program begins or ends. To help alleviate this situation, a front-end adjustment time period may be added to the start time for recording and/or a back-end adjustment time period may be added to the end time for recording. This may result in recording of the television program starting a first period of time before the scheduled start time and/or ending a second period of time after the scheduled end time.

While starting recording earlier based on a front-end adjustment time period and/or ending recording later based on a back-end adjustment time period may reduce the likelihood of a portion of a first television program being omitted from recording, EPG information associated with the time of the front-end adjustment time period may indicate an earlier scheduled second television program. Referring to the previous example, if a first television program is scheduled to be broadcast from 8:00 PM to 8:30 PM, addition of a three minute front-end adjustment time period may result in playback of the recorded file commencing at a point associated with 7:57 PM. From 7:57 PM until 7:59 PM, EPG information may be associated with a second television program scheduled to be broadcast from 7:30 PM until 8:00 PM. Therefore, while a user may have selected the first television program for playback, the user may be initially presented EPG information associated with the second television program. Such an arrangement may confuse a television viewer by presenting information for a television program other than the television program that the user desires to view. This situation may lead the user to believe he has accidentally selected the wrong television program for playback.

To cure this, during a front-end adjustment time period and/or back-end adjustment time period, EPG information for the television program selected for playback may be displayed. The EPG information displayed during this time period may not be the same EPG information as would have been displayed at the corresponding point if the television channel was watched by the user live during the initial broadcast. Further, in some embodiments, multiple television programs may be recorded as part of a single, channel-specific file. For example, for a given day, a channel-specific file may be recorded for a television channel that includes multiple television programs. For example, a channel-specific file may be created for the time period from 6:00 PM until 10:00 PM on a given channel. This file may contain each television program broadcast on the television channel during that time period. After recording of the channel-specific file, depending on which television program is selected for playback, the EPG information displayed may vary, even for playback of a same portion of the channel-specific file. For example, if a user selects a first television program for playback that was scheduled for broadcast from 8:00 PM until 9:00 PM, during a three minute front-end adjustment time period, EPG information associated with the first television program may be output for presentation during the time period of 7:57 PM through 7:59 PM. If the user instead (or at a later/earlier time) selects a second television program for playback that was scheduled from 7:00 PM until 7:59 PM (i.e., the hour preceding the first television program), the EPG information presented during the time period of 7:57 PM through 7:59 PM (and possibly until 8:03 PM) may be associated with the second television program. As such, during a same playback point in a channel-specific file, the EPG information presented (or available for presentation) may vary based on which television program was selected by the user for presentation.

A television program is defined to include a segment of content that is intended for broadcast. It may be a one-time production or part of a recurring series. Commercials may be broadcast between television programs and/or during television programs. A scheduled time period for a television program may contain multiple minutes devoted to commercials. For example, if a television program is scheduled to be broadcast for thirty minutes, seven or eight of these minutes may be devoted to commercials.

FIG. 1 illustrates an embodiment of a satellite television distribution system 100. While embodiments detailed herein may be applied to various television distribution systems, including cable and IP, a satellite television distribution system is provided as an exemplary television distribution system that may be used for EPG realignment. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
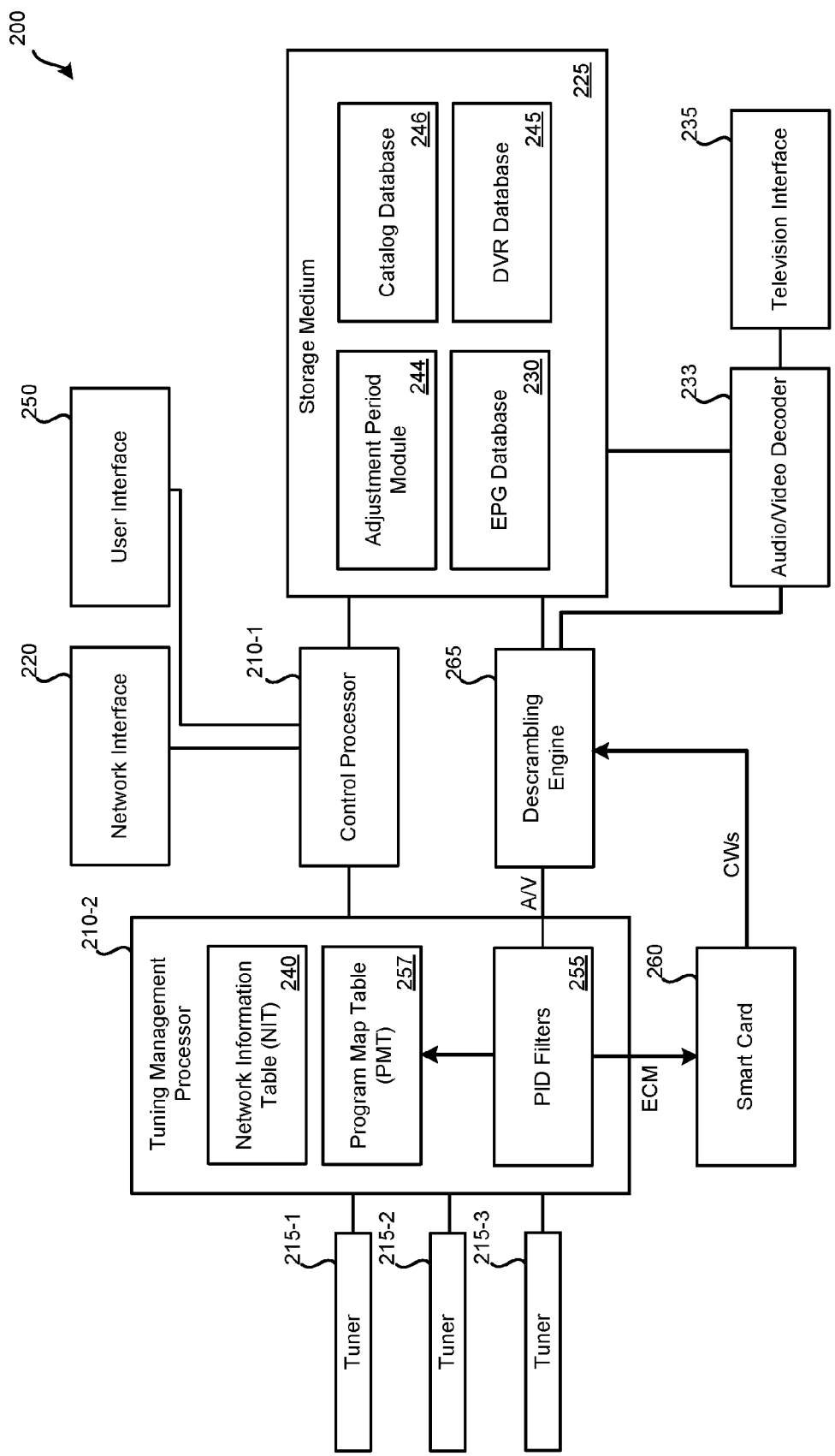
FIG. 2 illustrates an embodiment of a television receiver that is configured to realign electronic programming guide (EPG) information.

In communication with satellite dish 140 may be one or more sets of receiving equipment. Receiving equipment may be configured to decode signals received from satellites 130 via satellite dish 140 for display on a display device, such as display device 160. Receiving equipment, such as a television receiver, may be incorporated as part of a television or may be part of a separate device, commonly referred to as a set-top box (STB). Receiving equipment may include one or more satellite tuners configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of a television receiver. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from display device 160, it should be understood that in other embodiments, similar functions may be performed by a television receiver integrated with display device 160.

Display device 160, which may be a television, monitor, or some other display device, may be used to present video and/or audio decoded by television receiver 150. Television receiver 150 may also output a display of one or more interfaces to display device 160, such as an electronic programming guide (EPG).

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

Satellite television distribution system 100 may be used to provide television receiver 150 with data that indicates front-end and/or back-end adjustment time periods. Television service provider system 110 may determine such time periods based upon an analysis of when television channels tend to begin and/or end broadcast of television programs. In some embodiments, a historical analysis module 111 may analyze television channels on a channel-by-channel basis and provide indications of periods of time to use for a front-end and/or a back-end adjustment time period based on previous observed television program start and end times. In some embodiments, times for front-end and/or back-end adjustment time periods may be determined at television receiver 150.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200 configured to realign electronic programming guide (EPG) information. Television receiver 200 may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which may not involve an external STB being coupled with the television). A STB may contain some or all of the components of television receiver 200 and/or may be able to perform some or all of the functions of television receiver 200. Accordingly, instances in this document referring to a STB and steps being performed by a STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be television receiver 150 of FIG. 1 and may be in the form of a STB that communicates with a display device such as a television. Television receiver 200 may be incorporated as part of a television, such as display device 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, networking information table (NIT) 240, adjustment period module 244, digital video recorder (DVR) database 245, catalog database 246, user interface 250, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle in-coming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a transport stream of data from a satellite transponder (or a cable RF channel) at a given time. This transport stream may contain audio and video data for multiple television channels in addition to other data. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider. For example, the primary communication channel may be via satellite (which may be unidirectional to the television receiver) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, DVR database 245, adjustment period module 244, and/or catalog database 246. In some embodiments, storage medium 225 may also be used to store various tables, such as network information table (NIT) 240 and/or program map table (PMT) 257. Recorded television programs may be stored using storage medium 225. Storage medium 225 may be partitioned or otherwise divided such that predefined amounts of storage medium 225 are devoted to storage of channel-specific files and television programs recorded based on user-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Since EPG information about a television program is received before broadcast of the television program, the information may be inaccurate (e.g., the start time and/or end time for the television program may be one or more minutes off). Other data may be stored for the EPG that may be useful in managing channel-specific files, such as series identifiers and episode identifiers (which may be used by a television service provider to identify particular television programs).

A Digital Video Recorder (DVR) may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television stations. One or more timer files stored to storage medium 225 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to DVR database 245. Using an interface based on data from EPG database 230, a user may select a particular television program. Based on the date, time period, and television channel indicated by EPG database 230, control processor 210-1 may record the associated television program to DVR database 245. Second, DVR database 245 may be used to store recordings of predefined periods of time on one or more television channels. These predefined periods of time may include one or more television programs recorded to channel-specific files. For example, primetime on a particular television network may be recorded each weekday night. Further, multiple television channels may be recorded for such predefined periods of time. Such recording of television channels for predefined periods of time may be defined by the television service provider. A user may be permitted to enable or disable such recording of channel-specific files, while the television service provider may define the dates, times, and/or television channels recorded if such recording is enabled.

As an example of this second mode of DVR functionality, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight. If a television program is selected for recording by a user and is also specified for recording by the television service provider, the user selection may serve as an indication to save the television program for an extended time (beyond the time which the predefined recording would otherwise be saved).

Adjustment period module 244 may store data related to front-end and/or back-end adjustment periods. The length of time for adjustment periods may be defined by the television service provider or by a user of television receiver 200. The length of time for adjustment periods may vary on a channel-by-channel basis. The length of time for adjustment periods may vary for front-end and back-end adjustment periods. In some embodiments, the length of time to use for adjustment periods may be received via a television distribution network, which may involve data being transmitted via satellite. The length of time for adjustment periods may be determined by the television service provider and/or may be determined by the television receiver. Control processor 210-1 and/or some other processor, such as tuning management processor 210-2, may be configured to adjust recording and/or playback of channel-specific recordings stored in DVR database 245. Recording may be adjusted by starting such recording earlier or later and/or ending such recording earlier or later than the time period scheduled for the television program(s) indicated in EPG database 230. Playback may be adjusted by starting playback earlier or later and/or ending such playback earlier or later than the time period scheduled for the television program(s) indicated in EPG database 230. Further output of EPG information for presentation may be adjusted based on the television program selected for playback, a front-end adjustment time period, a back-end adjustment time period, and/or the scheduled broadcast time period for a television program.

A catalog database, such as catalog database 246 of television receiver 200 of FIG. 2, may be maintained. For each recorded television program, an entry may be made in the catalog database. The catalog database may indicate an identifier for a television program and a file in which the television program is stored. If the television program is stored as part of a channel-specific file (which can contain multiple television programs), a file offset may be stored within the catalog database for the television program. Table 1 provides an example of several entries which may be present in a catalog database. In some embodiments, a catalog database may store series and episode identifiers for some or all television programs.

TABLE 1

| Television Program Identifier | File Name | File Offset (bytes) | Marked for Save? |
|---|---|---|---|
| 2738239 | es2738239.tsp | 0 | No |
| 9034836 | es2738239.tsp | 9832939 | Yes |

TABLE 1-continued

| Television Program Identifier | File Name | File Offset (bytes) | Marked for Save? |
|---|---|---|---|
| 4854557 | es1003293.tsp | 10239832 | No |
| 1122092 | es1122092.tsp | 0 | No |

A catalog database may provide data such as that indicated in Table 1. For example, a catalog database may include a television program identifier, a file name of the file in which the television program resides, a file offset (if any), and an indication of whether a user has marked the corresponding television program for saving. A television program identifier may be a unique number that is assigned to a television program at the television receiver. The file name associated with each television program identifier may indicate the file in which the associated television program is stored. This file may be a file specific to the television program or may be a channel-specific file which contains multiple television programs. As an example, the first two television program identifiers in Table 1 each correspond to the same file name. Accordingly, both of these television program identifiers are associated with television programs present in the same channel-specific file. In some embodiments, it may be a practice to name each channel-specific file after the program identifier of the first television program recorded to the channel-specific file. As such, the filename associated with television program identifier "2738239" contains "2738239." The file offset may be used to determine a location, within a file for television programs, that contains multiple television programs.

During recording of a channel-specific file, the file offset may be determined. For the first television program recorded as part of a channel-specific file, the offset may be zero. For subsequent television programs recorded to the same channel-specific file, the file offset may be determined by measuring the file size, in bytes, when the television program begins recording. It may be determined when the television program begins recording based on the start time for the television program indicated in EPG database 230 stored by the television receiver. For example, referring to Table 1, the television program associated with television program identifier 9034836 begins at a file offset of 9832939 bytes. A television program is determined to end at either the end of the file or the next file offset within the same file indicated by the catalog database. For example the television program associated with television program identifier "2738239" ends at a file offset of 9832938 bytes (based on the file offset associated with television program identifier "9034836").

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245 and/or information from EPG database 230) to a television for presentation.

The Network Information Table (NIT) 240 may store information used by television receiver 200 to access various television channels. NIT 240 may be stored locally by a processor, such as by tuning management processor 210-2. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers, frequency identifiers and/or transponder identifiers for various television channels. In some embodiments, NIT 240 may contain additional data or additional tables may be stored by the television receiver. For example, specific audio PIDs and video PIDs may not be present in NIT 240; a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, video PIDs, and/or ECM (entitlement control message) PIDs for television channels that are transmitted on a transponder frequency.

Table 2 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 2

| Channel | Satellite | Transponder |
|---|---|---|
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel. In some embodiments, the NIT may indicate a particular frequency to which to tune for a particular television channel. Once tuned to the proper satellite/transponder/frequency, a known PMT PID may be used to retrieve a program map table that indicates the PIDs for audio and video streams of television channels transmitted by that transponder.

It should be understood that the values provided in Table 2 are for example purposes only. Actual values, including how satellites and transponders are identified, may vary. Additional information may also be stored in NIT 240. Additional information on how NIT 240, as indicated in Table 2, may be used is provided in reference to FIG. 3.

User interface 250 may include a remote control (physically separate from television receiver 200) and/or one or more buttons on television receiver 200 that allows a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with particular television channel. Particular data packets, referred to as entitlement control messages (ECMs) may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite) a PID filter may be created based on a PID of PMT data. The PID of PMT data packets may be known because it is stored as part of NIT 240 or another table, such as a PAT. From the PMT data packets, PMT may be constructed by tuning management processor 210-2. Table 3 provides an exemplary extract of a PMT. PMT 257 may be specific to a particular transponder. As such, if tuning to a different transponder occurs, a new PMT may be created for the different transponder.

TABLE 3

| Channel | Video PID | $1^{st}$ Audio PID | $2^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 3 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

Television receiver 200 may be configured to record channel-specific files that contain multiple television programs. For example, processors 210 may be configured to cause multiple television channels to be recorded to channel-specific files, in which each file contains multiple television programs. These channel-specific files may be stored by DVR database 245. A user may be permitted to select a channel-specific file or a specific television program from within a channel-specific file for playback.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
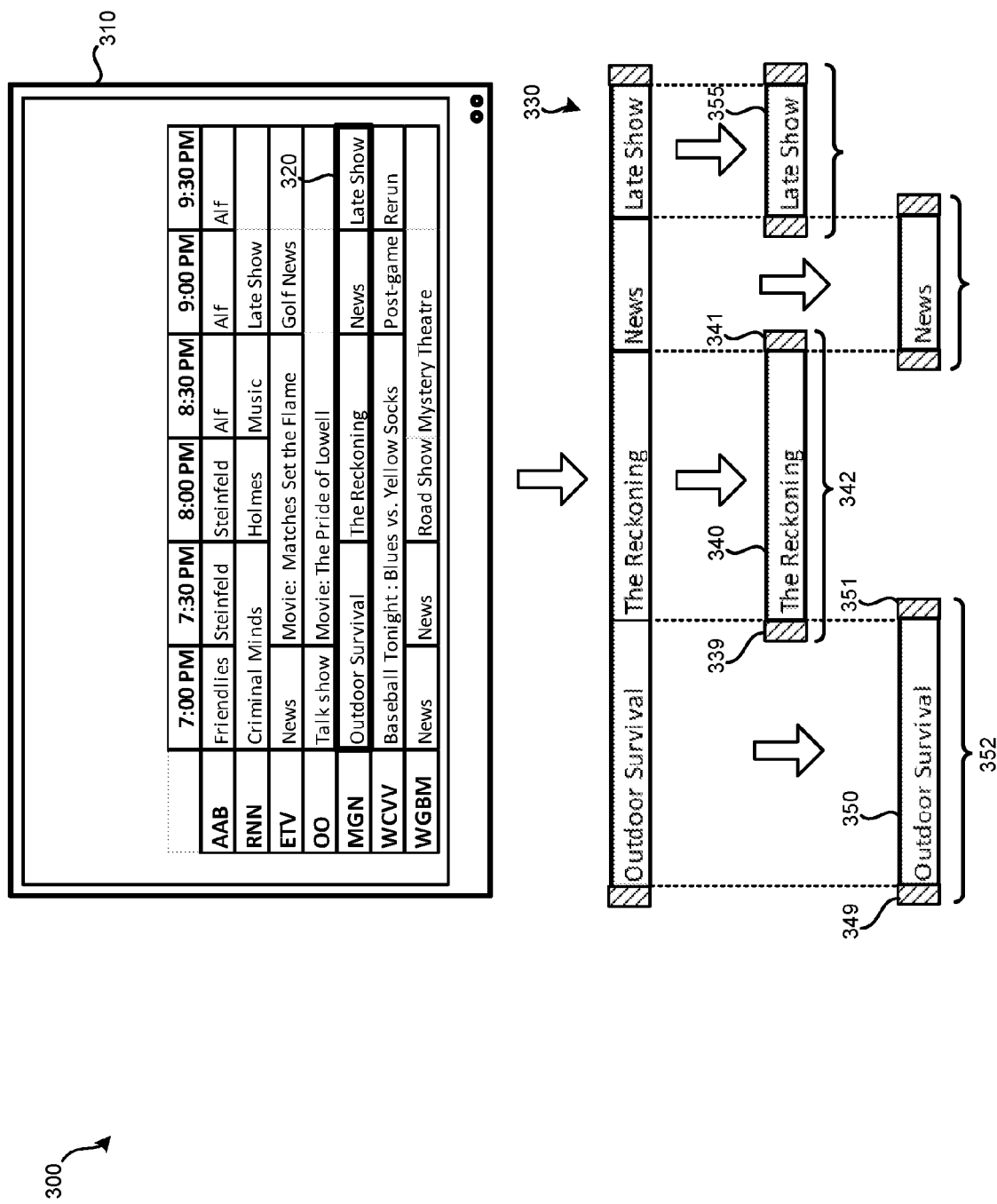
FIG. 3 illustrates an embodiment of front-end and back-end adjustment time periods applied to recordings of television programs in a channel-specific file.

FIG. 3 illustrates an embodiment 300 of front-end and back-end adjustment time periods applied to recordings of television programs in a channel-specific file. In embodiment 300, television channel "MGN" has been recorded. A single channel-specific file 330 is created that stores television programming corresponding to EPG entries 320. A user may have the ability to turn on or off recording of a channel-specific file. The television service provider may define the television channel, the dates, and/or the times for recording to create the channel-specific file. For example, a television service provider may define that each major network (e.g., ABC, CBS, NBC, and FOX) is recorded during primetime nightly. Each television channel to be recorded to its own channel-specific file may be received as part of a single transponder stream by a single tuner of a television receiver.

Channel-specific file 330 is recorded on television channel "MGN" from 7:00 PM to 10:00 PM (which may be increased in length for front-end and back-end adjustment time periods for the first and last television program recorded as part of channel-specific file 330). As such, channel-specific file 330 contains multiple television programs. While channel-specific file 330 is being recorded, EPG data for EPG entry 320 may be used to determine the start and end times of the television programs that are recorded as part of channel-specific file 330. Event transitions may occur when the stored EPG data indicates that the television program being recorded has transitioned to another television program. For example, according to EPG entries 320, an event transition occurs at 8:00 PM when "Outdoor Survival" is scheduled to end and "The Reckoning" is scheduled to begin. EPG entries 320 are obtained from an EPG database of the television receiver, which may have received data from a television service provider via a television distribution network (e.g., satellite television distribution system 100 of FIG. 1). The data for EPG entries 320 may have been received by the television receiver ahead of broadcast of the television programs (in some arrangements, EPG information is sent one to two weeks ahead of broadcast of the associated television programs). Therefore, the scheduled times indicated by EPG entries 320 are expected to be approximately accurate, but may vary by multiple minutes early or late.

When an event transition occurs, an entry may be made in a database, such as a catalog database, that indicates when a television program, according to EPG data, begins in a channel-specific file. When an event transition occurs, the file size of the channel-specific file may be measured to determine the point where the television program is scheduled to begin recording into the channel-specific file. This measured point in the file may be later used to locate where the television program was scheduled to begin. The file name of the channel-specific file and the file offset may be associated in the catalog database with an identifier of the television program. If this television program is selected for playback by a user at some future time (such as from a DVR menu of the television receiver), the catalog database may be used to look up the file which the television program is part of and the file offset for where the television program was scheduled to begin within the channel-specific file.

While, ideally, EPG entries 320 are exactly accurate (e.g., a television program scheduled to begin at 8:30 begins exactly at 8:30), it is likely that the television program may have begun broadcast up to a few minutes (or more) early or up to a few minutes (or more) late. In some situations, as a more extreme example, a television program may begin broadcast up to ten minutes early or up to ten minutes late (e.g., an earlier sporting event ran late, thus pushing back the start times of scheduled programming). Since the timing of recording of television programming may be based off of EPG data received prior to broadcast of the television programs to be recorded, playback based precisely off of the portion of the channel-specific file attributed to the television program according to the begin and end times indicated by the EPG data may be inaccurate. As such, a front-end adjustment time period and/or a back-end adjustment time period may be applied to the playback of a television program from a channel-specific file to decrease the possibility of a portion of the television program being missed from playback.

The length of an adjustment time period (which may be front-end or back-end) may be specified by the television service provider or by a user of the television receiver. In some embodiments, three minutes are used for the length of adjustment periods. In some embodiments, the adjustment period length of time may be between two and four minutes. In some embodiments, the adjustment period length of time may be between one and five minutes. In some embodiments, the length of the front-end and back-end adjustment time periods may vary. The length of time for adjustment periods may be positive (increasing the amount of playback time) or negative (decreasing the amount of playback time).

As an example, referring to television program 340, "The Reckoning," EPG data indicates that broadcast of the television program was scheduled from 8:00 PM until 9:00 PM. Data (possibly including an indication of one or more file offsets) may have been stored to a catalog database that indicates a scheduled start and end point for television program 340 within channel-specific file 330. To ensure the entire television program is played back, a front-end and/or back-end adjustment time period may be additionally played back to ensure no portion of the television program is omitted from playback to the user. Front-end adjustment time period 339 and back-end adjustment time period 341 may be added to the playback of television program 340.

Front-end adjustment time period 339 may be an amount of data in channel-specific file 330 immediately preceding the scheduled start point (as indicated by the EPG data) for television program 340. Back-end adjustment time period 341 may be an amount of data immediately following the scheduled end point (as indicated by the EPG data) for television program 340 in channel-specific file 330. Depending on the actual time of broadcast, front-end adjustment time period 339 may result in a portion of the immediately earlier television program recorded as part of channel-specific file 330 being played back. In this example, at least a portion of "Outdoor Survival" may be played back as part of front-end adjustment time period 339. Back-end adjustment time period 341 may result in a portion of the immediately later television program recorded as part of channel-specific file 330 being played back. In this example, a portion of the "News" may be played back as part of back-end adjustment time period 341. The length of time for the front-end and/or back-end adjustment time periods may be defined as a number of bytes. As such, from a file offset that indicates the scheduled start time of a television program in the catalog database, a number of bytes may be subtracted to reach an earlier point to be used as the start point (that now includes the front-end adjustment time period). From another file offset that indicates the scheduled end time of the television program, a number of bytes may be added to reach a later point to be used as the end point (that now includes the back-end adjustment time period). When playback of television program 340 is selected, portion 342 of channel-specific file 330 may be played back.

Referring now to television program 350, similar front-end and back-end adjustment time periods may be added for playback from channel-specific file 330. As can be seen in FIG. 3, the back-end adjustment time period 351 may overlap a portion of television program 340. Television program 350 is the first television program recorded as part of channel-specific file 330. Recording of channel-specific file 330 may begin early such that front-end adjustment time period 349 is recorded as part of channel-specific file 330 (a similar back-end adjustment may be made at the end of television program 355). When playback of television program 350 is selected, portion 352 of channel-specific file 330 may be played back.

In addition to adjusting the start and end points within a channel-specific file for playback based on adjustment time periods, the EPG information presented during such time periods may vary. Referring to EPG entries 320, EPG information displayed at a particular time while television channel MGN is being viewed may result in EPG information specific to the currently broadcast television program being displayed. For example, EPG information displayed at 8:01 PM may be about "The Reckoning." When EPG information is presented for a television program within a channel-specific file, such as channel-specific file 330, factors other than the playback point may be used to select the EPG information presented.

When channel-specific file 330 is created, a bookmark file associated with channel-specific file 330 may be created. The bookmark file may contain EPG data obtained from the EPG database of the television receiver that is about each television program recorded as part of channel-specific file 330. EPG data from the bookmark file may be used for displaying information about the television program during playback.

If a user has selected television program 340 for playback, EPG information about television program 340 may be presented (or available for display) while portion 342 of channel-specific file 330 is being played back. However, if television program 350 is selected for playback by user, EPG information about television program 350 may be presented (or may be available for display) while portion 352 of channel-specific file 330 is being played back. Therefore, a same part of channel-specific file 330 may be played back while being associated with different EPG information, depending on which television program was selected for playback. For example, EPG information presented during back-end adjustment time period 351 may be associated with television program 350 if television program 350 was selected for playback; during playback of this same portion of the channel-specific file, EPG information associated with television program 340 may be presented if television program 340 was selected for playback from channel-specific file 330. As such, the same audio/video of channel-specific file 330 may be presented with different EPG information depending on which television program from the channel-specific file is to be played back. In some embodiments, EPG information may automatically be displayed, while in other embodiments, EPG information is displayed upon user input requesting that EPG information be displayed.

Figure 4:
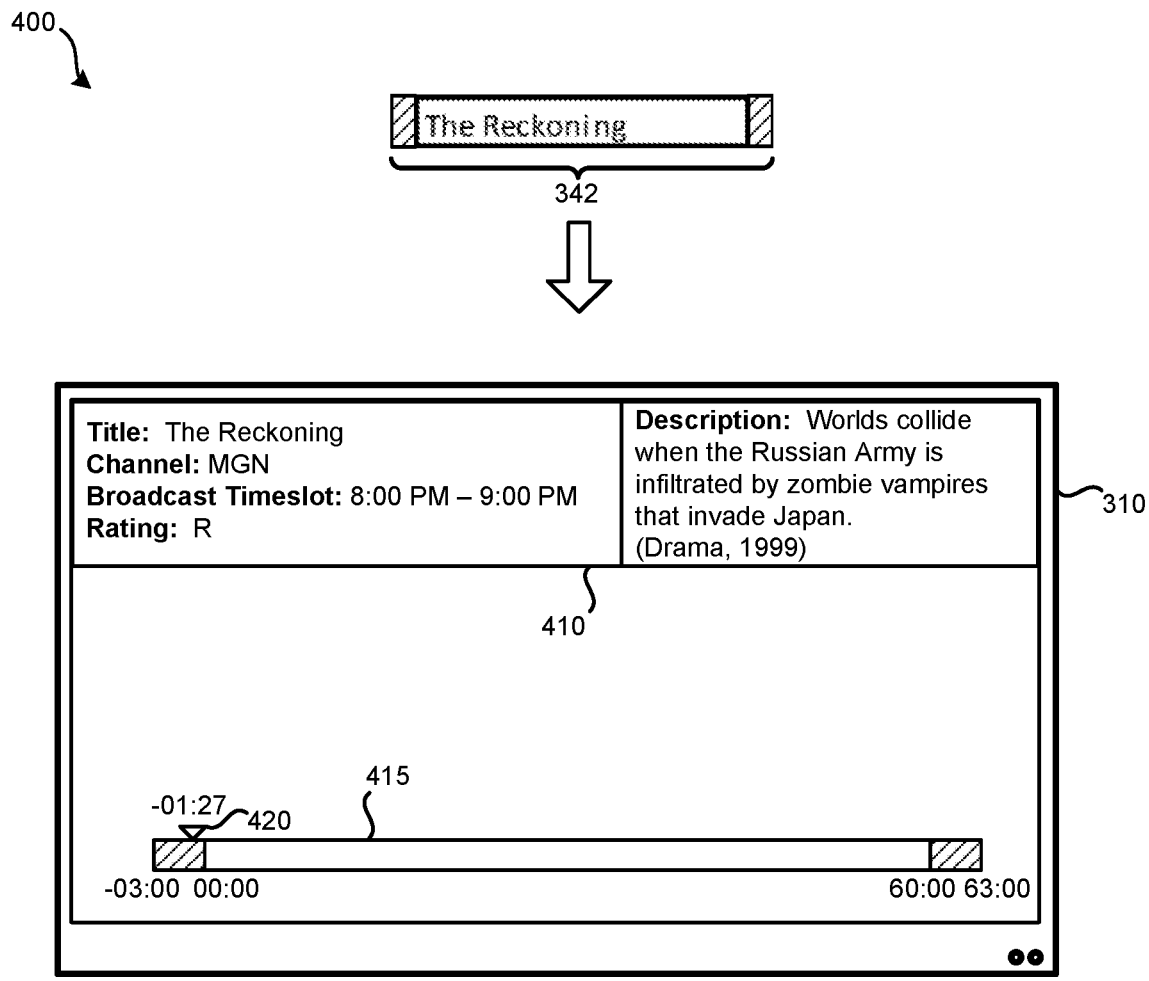
FIG. 4 illustrates an embodiment of EPG information being presented during a front-end adjustment time period.

FIG. 4 illustrates an embodiment 400 of EPG information being presented during a front-end adjustment time period. The EPG information is being presented by display device 310. Referring back to embodiment 300 of FIG. 3, playback of television program 340 has been selected by a user. When a front-end adjustment time period and a back-end adjustment time period is added to the portion of channel-specific file 330 attributed to television program 340 (based on EPG data), portion 342 of channel-specific file 330 is played back upon user selection of television program 340. EPG information relating to television program 340 may be presented (either automatically or upon user request) by the television receiver via display device 310 during front-end adjustment time period 339, back-end adjustment time period 341 and the portion of channel-specific file 330 originally scheduled for television program 340. It should be understood that EPG information 410 and/or status bar 415 may be overlaid on video being presented from a channel-specific file.

EPG information 410 may include information about the television program selected for playback, such as: a title, a channel on which the television program was broadcast, a timeslot during which the television program was scheduled to be broadcast, a rating, a description, a category, and/or an original broadcast time date/year. The content of EPG information 410 may be determined based on user preferences or by the television service provider. EPG information 410 may be obtained from a bookmark file associated with the channel-specific file from which playback of the television program occurs.

In the illustrated embodiment 400, playback (as indicated by playback indicator 420) is currently within a front-end adjustment time period. During the initial broadcast, the EPG information presented at this time point may be other than the EPG information displayed in embodiment 400. For example, the EPG information presented with the video/audio displayed by display device 310 may have been associated with television program 350, which was broadcast immediately before television program 340. However, since a user has selected television program 340 for playback from channel-specific file 330, EPG information for television program 340 will be presented during the front-end adjustment time period of television program 340. EPG information displayed with this audio/video portion of channel-specific file 330 may be for television program 350 if television program 350 had been selected for playback. Referring to FIG. 3, it can be seen how portion 352 overlaps portion 342.

It should be understood that the layout and specific content of embodiments 300 and 400 of FIGS. 3 and 4, respectively, may vary by embodiment. These embodiments are intended as examples only; other embodiments may contain more or less displayed data, and have EPG data displayed in a different graphical format. The specific television channels, television programs, and descriptions listed are for example purposes only, and do not affect the scope of the various embodiments detailed herein.

Figure 5:
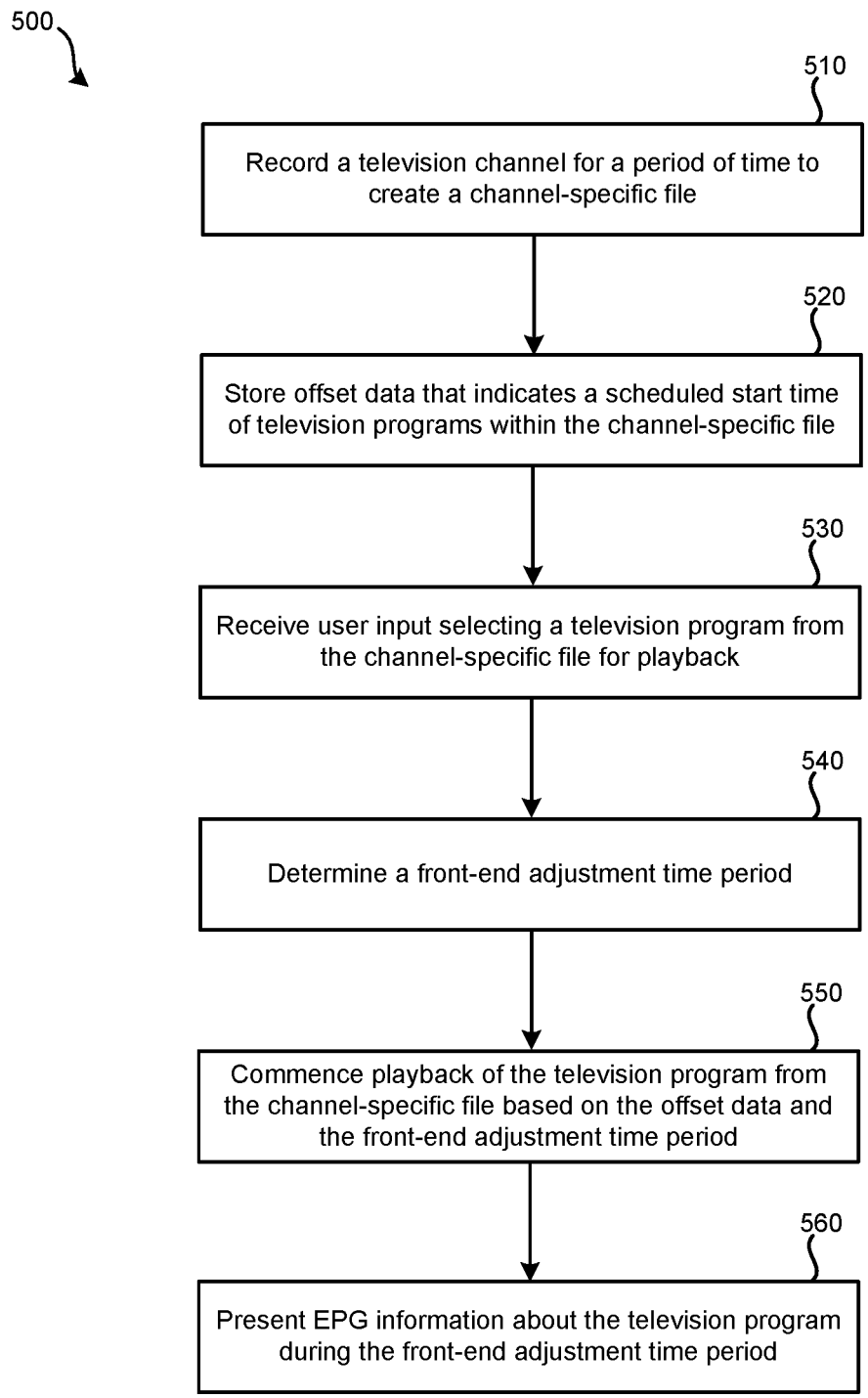
FIG. 5 illustrates an embodiment of a method for adjusting playback of television programming.

Various methods may be performing using the systems of FIGS. 1 and 2 and the embodiments of FIGS. 3 and 4. FIG. 5 illustrates an embodiment of a method 500 for adjusting playback of television programming. Each step of method 500 may be performed by a television receiver, such as television receiver 200 of FIG. 2. The television receiver performing method 500 may be computerized and may contain components similar to computer system 700 of FIG. 7. Means for performing each step of method 500 include one or more instances of some or all components of television receiver 200 of FIG. 2 and/or one or more instances of some or all components of computer system 700 of FIG. 7. In method 500, a front-end adjustment period is used such that playback of a television program begins a period of time before the television program is scheduled to begin according to stored EPG data. In other embodiments, a back-end adjustment period may be used in addition or alternately to the front-end adjustment period.

At step 510, a television channel may be recorded for a period of time to create a channel-specific file. This channel-specific file may contain multiple television programs. The channel-specific file may be created based on a user-defined timer or may be recorded at a date and time on a channel specified by the television service provider. In some embodiments, an indication of a date, time period and which television channel is to be recorded to create the channel-specific file is based on data received by the television receiver from the television service provider via a television distribution network, such as satellite television distribution system 100 of FIG. 1. In some embodiments, multiple channel-specific files may be recorded over the same period of time by the television receiver. For example, the television receiver may be configured to record multiple channels into their own channel-specific files over a same period of time. These multiple television channels may be received by the television receiver on a single transponder stream, thus allowing a single tuner of the television receiver to receive the television channels that are being recorded.

At step 520, offset data that indicates a scheduled start time of television programs within the channel-specific file may be stored. The file offsets may be based on the scheduled start time for the television programs being recorded as part of the channel-specific file. When an event transition occurs during recording, the current size of the channel-specific file may be measured. The measure of the size may be stored as the file offset that indicates when the television program is scheduled to begin. As such, for each television program stored within a channel-specific file, a file offset may be stored that indicates the point within the channel-specific file at which the television program is scheduled to begin. In some embodiments, file offsets for the end of television programs may also be stored. In other embodiments, the file offset that indicates the beginning of a television program may be used to indicate the end of the previous television program. In other embodiments, another location identification arrangement may be used for identifying where television programs begin within the channel-specific file. Offset data may be stored as part of a catalog database or some other storage arrangement that is used to store data about recorded television programming.

At step 530, user input may be received that selects a television program from the channel-specific file recorded at step 510 for playback. In some embodiments, a user may access a DVR menu of the television receiver and select the television program for playback. The user input may be received via a remote control associated with the television receiver.

At step 540, a length of time for a front-end adjustment period may be determined. The length of time for the front-end adjustment period may be based on a user preference. For example, via the television receiver, the user may be permitted to specify an amount of time to be used for front-end adjustment periods (such as from one to ten minutes). In some embodiments, the length of time for the front-end adjustment period may be specified by the television service provider. In some embodiments, a default value stored by the television receiver is used for the length of time for the front-end adjustment period. If the length of time to be used as the front-end adjustment period is received from the television service provider via a television distribution system, the television service provider may determine the length of time based on a channel-by-channel analysis of when television programs typically begin broadcast. As such, the length of time used for the front-end adjustment period may vary on a channel-by-channel basis. If the length of time for the adjustment period is determined by the television service provider, determining the front-end adjustment period at step 540 may involve the television receiver looking up a stored adjustment period value that is associated with all front-end adjustment periods or front-end adjustment periods for the television channel from which the channel-specific file was recorded.

At step 550, playback of the television program from the channel-specific file may be based on the offset data which indicates where the television program was scheduled to begin during the broadcast of the television channel that was recorded at step 510. Playback commenced at step 550 may be adjusted based on the front-end adjustment time period determined at step 540. For example, playback may be commenced at a point within the channel-specific file recorded earlier than the point indicated by the offset data (based on the EPG data received prior to broadcast of the television program). As such, playback within the channel-specific file may begin at a point associated with an earlier record time. For example, if the television program was scheduled to be broadcast at 8:00 PM (according to the EPG data) and the front-end adjustment period is three minutes, playback may be commenced at the portion of the channel-specific file recorded at 7:57 PM.

At step 560, EPG information about the television program may be output for display by the television receiver during the front-end adjustment period. This EPG information may indicate details about the television program selected for playback at step 530, such as a description and title. The EPG information presented during the front-end adjustment period may be based on the television program selected for playback by the user. Since the front-end adjustment time period is added to before the scheduled time slot for a television program, the EPG information displayed during the front-end adjustment time period may be presented during a second television program's time slot. The EPG information presented may not be the same EPG information that was presented during the same point in the broadcast of the television program. Further, other EPG information may be presented during playback during the same portion of the channel-specific file if a different television program was selected for playback. For example, referring to FIG. 3, the EPG information presented during front-end adjustment time period 339 may be associated with television program 340, if television program 340 was selected for playback from the channel-specific file. However, the EPG information presented during this same point of channel-specific file 330 (e.g., the same video may be presented by display device 310) may be associated with television program 350 if television program 350 was selected for playback. As such, the EPG information output for presentation by the television receiver may be based on a television program selected for playback from the channel-specific file rather than the point within the channel-specific file being played back.

While method 500 focuses on a front-end adjustment time period, it should be understood that the principles applied may be applicable to back-end adjustment time periods and presentation of EPG information during such a back-end adjustment time period.

Figure 6:
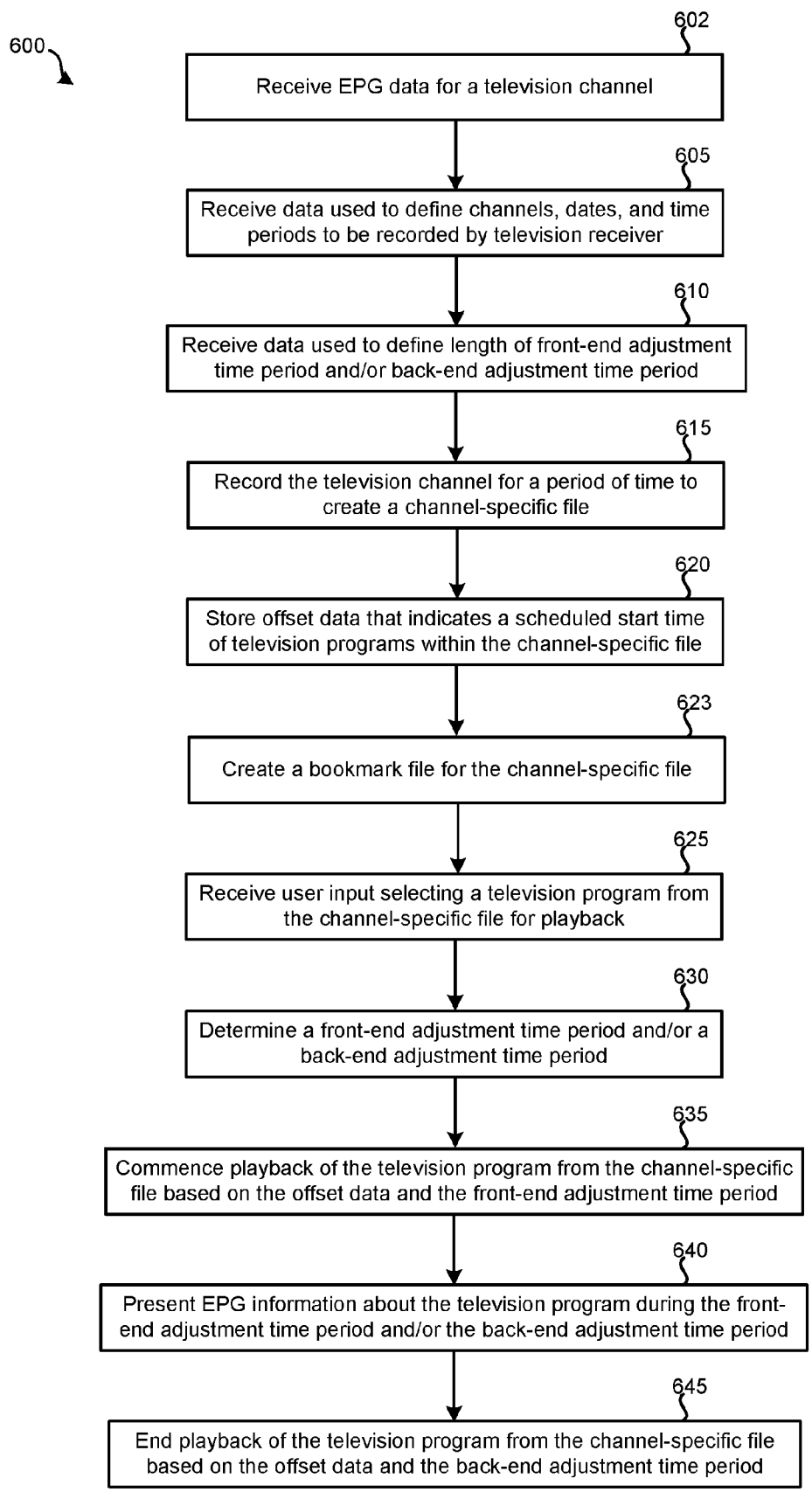
FIG. 6 illustrates another embodiment of a method adjusting playback of television programming.

FIG. 6 illustrates an embodiment of a method 600 adjusting playback of television programming. Each step of method 600 may be performed by a television receiver, such as television receiver 200 of FIG. 2. The television receiver performing method 600 may be computerized and may contain components similar to computer system 700 of FIG. 7. Means for performing each step of method 600 include one or more instances of some or all components of television receiver 200 of FIG. 2 and/or one or more instances of some or all components of computer system 700 of FIG. 7. In method 600, a front-end adjustment period is used such that playback of a television program begins a period of time before the television program is scheduled to begin according to stored EPG data. In other embodiments, a back-end adjustment period may be used in addition or alternately to the front-end adjustment period.

At step 602, EPG data may be received for a television channel. This EPG data may be stored by the television receiver in an EPG database. This EPG data may contain various pieces of information about television programming scheduled to be broadcast in the future, such as the scheduled broadcast date, time period, and channel. A user may request that portions of the EPG data be displayed such that the user can view a schedule of television programming scheduled to be broadcast on the television channel. For example, a user may view EPG information as presented by display device 310 in FIG. 3.

At step 605, data may be received by the television receiver via a television distribution network that indicates television channels, dates, and time periods that are to be recorded as part of channel-specific files. A user may be permitted to enable or disable channel-specific file recording; however, the channels, dates, and/or time periods for recording of channel-specific files may be defined by the television service provider.

At step 610, data may be received by the television receiver that defines a length of time to use for front-end adjustment time periods and/or back-end adjustment time periods. These time periods may vary on a channel-by-channel basis or may be standardized by the television service provider across multiple television channels. The television service provider may determine the length of such times based on a historical analysis of the television channel. In other embodiments, rather than data being received via a television distribution network, the length of time to use for front-end adjustment time periods and/or back-end adjustment time periods may be received from the user and stored by the television receiver as a user preference. Such user preference may be for all channels or may be specified by the user on a channel-by-channel basis.

At step 615, the television channel may be recorded for a period of time to create a channel-specific file. The time period may be defined by the data received at step 605. As recorded, this channel-specific file may contain multiple television programs. In some embodiments, multiple channel-specific files may be recorded over the same period of time by the television receiver. For example, the television receiver may be configured to record multiple channels into their own channel-specific files over a same period of time. These multiple television channels may be received by the television receiver on a single transponder stream, thus allowing a single tuner of the television receiver to receive the television channels that are being recorded.

At step 620, offset data that indicates a scheduled start time of television programs within the channel-specific file may be stored. The file offsets may be based on the scheduled start time for the television programs being recorded as part of the channel-specific file. When an event transition (as indicated by stored EPG data that was received at step 602) occurs during recording, the current size of the channel-specific file may be measured. The measure of the size may be stored as the file offset that indicates when the television program is scheduled to begin in the channel-specific recording. As such, for each television program stored within a channel-specific file, a file offset may be stored that indicates the point within the channel-specific file at which the television program is scheduled to begin. In some embodiments, file offsets for the end of television programs may also be stored. In other embodiments, the file offset that indicates the beginning of a television program may be used to indicate the end of the previous television program. In other embodiments, another location identification arrangement may be used for identifying where television programs begin within the channel-specific file. Offset data may be stored as part of a catalog database or some other storage arrangement that is used to store data about recorded television programming.

At step 623, a bookmark file for the channel-specific file may be created. The bookmark file may store the EPG information associated with each television program recorded as part of the channel-specific file. As such, the bookmark file may contain data used to present EPG information during playback of the recorded channel-specific file. This bookmark file may be stored in association with the channel-specific file such as by the two files having a common file name with a different file name extension. The bookmark file created at step 623 may be created based on the EPG data received at step 602.

At step 625, user input may be received that selects a television program from the channel-specific file recorded at step 615 for playback. In some embodiments, a user may access a DVR menu of the television receiver and select the television program for playback. The user input may be received via a remote control associated with the television receiver.

At step 630, a length of time for a front-end adjustment period and/or back-end adjustment period may be determined. The length of time for the front-end and/or backend adjustment period may be based on data received at step 610. If the length of time to be used as the front-end adjustment period is received from the television service provider via a television distribution system, the television service provider may determine the length of time based on a channel-by-channel analysis of when television programs typically begin broadcast. As such, the length of time used for the front-end adjustment period may vary on a channel-by-channel basis. If the length of time for the adjustment period is determined by the television service provider, determining the front-end adjustment period at step 630 may involve the television receiver looking up a stored adjustment period value as received at step 610 that is associated with all front-end/back-end adjustment period periods or front-end/back-end adjustment periods for the television channel from which the channel-specific file was recorded.

At step 635, playback of the television program from the channel-specific file may be based on the offset data which indicates where the television program was scheduled to begin during the broadcast of the television channel that was recorded at step 615. Playback commenced at step 635 may be adjusted based on the front-end adjustment time period determined at step 630. In some embodiments, the front-end adjustment time period may be specified as a number of bytes. As such, this number of bytes may be subtracted from the file offset of the television program to determine a starting point for playback that includes a front-end adjustment time period. If the front-end adjustment time period is specified as an amount of time, this time may be converted to a number of bytes (e.g., a time period of one second may be estimated to be associated with a predefined number of bytes). In some embodiments, a number of frames may be counted back in the channel-specific file to an earlier starting point for the front-end adjustment time period. Playback may be commenced at a point within the channel-specific file recorded earlier than the point indicated by the offset data (based on the EPG data received prior to broadcast of the television program). As such, playback within the channel-specific file may begin at a point associated with an earlier time of recording. For example, if the television program was scheduled to be broadcast at 8:00 PM (according to the EPG data) and the front-end adjustment period is three minutes, playback may be commenced at the portion of the channel-specific file recorded at 7:57 PM.

At step 640, EPG information about the television program may be output for display by the television receiver at some point during the front-end adjustment period. This EPG information may indicate details about the television program selected for playback at step 625, such as illustrated in embodiment 400 of FIG. 4. The EPG information presented during the front-end adjustment period may be based on the television program selected for playback by the user. The EPG information presented may not be the same EPG information that was presented during the same point in the broadcast of the television program. Further, other EPG information may be presented during playback during the same portion of the channel-specific file if a different television program was selected for playback. For example, referring to FIG. 3, the EPG information presented during front-end adjustment time period 339 may be associated with television program 340, if television program 340 was selected for playback from the channel-specific file. However, the EPG information presented during this same point of channel-specific file 330 (e.g., the same bytes of channel-specific file 330 being used to output video and/or audio) may be associated with television program 350 if television program 350 was selected for playback. As such, the EPG information output for presentation by the television receiver may be based on a television program selected for playback from the channel-specific file rather than the point within the channel-specific file being played back.

At step 645, playback of the television program from the channel-specific file may end upon an offset being reached that indicates the start of the next television program recorded as part of the channel-specific file (or the end of the file has been reached). Playback ended at step 645 may be adjusted based on the back-end adjustment time period determined at step 630. The length of the back-end adjustment time period may be based on a number of bytes or frames as discussed in relation to the front-end adjustment time period. Playback may be ended at a point within the channel-specific file recorded later than the point indicated by the offset data (which is based on the EPG data received prior to broadcast of the television program). As such, playback within the channel-specific file may end at a point associated with a later record time. For example, if the television program was scheduled to end being broadcast at 8:30 PM (according to the EPG data) and the back-end adjustment period is three minutes, playback may end at the portion of the channel-specific file recorded at 8:33 PM.

During this back-end adjustment time period, if EPG information about the television program is output for display by the television receiver, EPG information may indicate details about the television program selected for playback at step 625, such as a description and title. The EPG information presented during the back-end adjustment period may be based on the television program selected for playback by the user. The EPG information presented may not be the same EPG information that was presented during the corresponding point in the broadcast of the television program. (For example, the EPG information presented during the corresponding point during the broadcast may have been associated with a television program beginning to be broadcast.)

Figure 7:
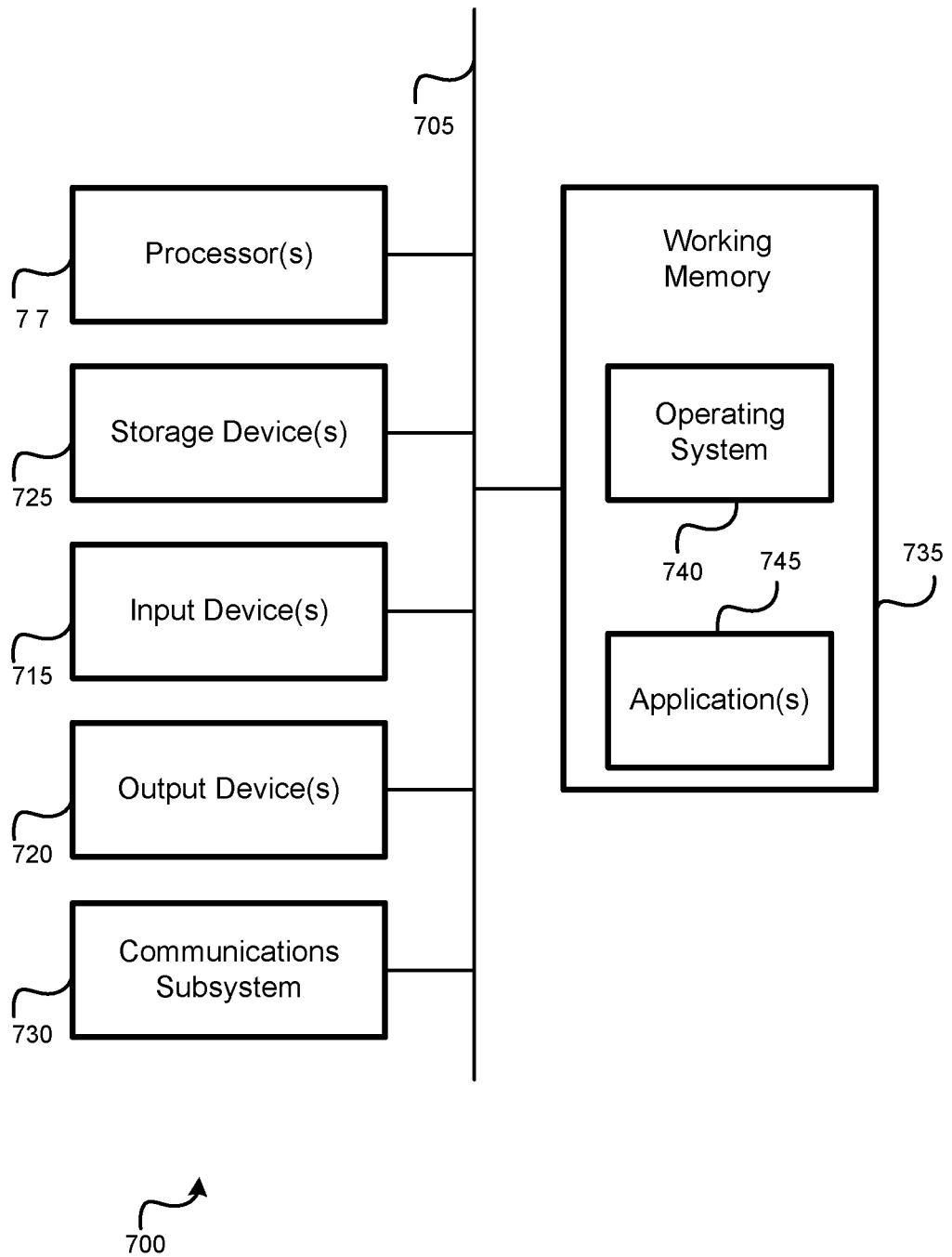
FIG. 7 illustrates an embodiment of a computer system.

FIG. 7 illustrates an embodiment of a computer system. A computer system as illustrated in FIG. 7 may be incorporated as part of the previously described computerized devices. For example, computer system 700 can represent some of the components of the television receiver and/or television service provider system discussed in this application. FIG. 7 provides a schematic illustration of one embodiment of a computer system 700 that can perform steps of the methods. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations.

Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A television receiver that synchronizes electronic programming guide information with playback of a television program recording, the television receiver comprising:
   one or more tuners;
   one or more processors;
   a memory communicatively coupled with and readable by the one or more processors and having stored therein processor-readable instructions which, when executed by the one or more processors, cause the one or more processors to:
      record, from the one or more tuners, a plurality of consecutively broadcast television programs to a single file, wherein:
         the plurality of consecutively broadcast television programs comprises a first television program and a second television program, and
         the second television program was recorded to the single file from a second timeslot immediately following a first timeslot of the first television program;
      after recording the plurality of consecutively broadcast television programs to the single file, receive input requesting the recorded first television program be output for presentation;
      determine a back-end adjustment period for playback of the first television program from the single file, wherein the back-end adjustment period immediately follows a scheduled end time of the first television program, the scheduled end time of the first television program being based on stored electronic programming guide information;
      in response to the input requesting the first television program be output for presentation, output content from the single file for presentation to a display device, the output of the content concluding with the back-end adjustment period; and
      while outputting content from during the back-end adjustment period, output for presentation electronic programming guide (EPG) information associated with the first television program, while not outputting electronic programming guide information associated with the second television program.

2. The television receiver for synchronizing electronic programming guide information with playback of the television program recording of claim 1, wherein the processor-readable instructions, when executed, further cause the one or more processors to:
   receive, via the one or more tuners, an indication of a duration to use as the back-end adjustment period.

3. The television receiver for synchronizing electronic programming guide information with playback of the television program recording of claim 1, wherein the processor-readable instructions, when executed, further cause the one or more processors to:
   receive, via user input, an indication of a duration to use as the back-end adjustment period.

4. The television receiver for synchronizing electronic programming guide information with playback of the television program recording of claim 1, wherein the electronic programming guide information associated with the first television program that is output for presentation comprises a title of the first television program.

5. The television receiver for synchronizing electronic programming guide information with playback of the television program recording of claim 1, wherein the processor-readable instructions, when executed, further cause the one or more processors to:
   determine a front-end adjustment period for playback of the second television program from the single file, wherein the front-end adjustment period immediately precedes a scheduled start time of the second timeslot for the second television program, the scheduled start time of the second timeslot being based on the electronic programming guide information for the second television program; and
   output content corresponding to the front-end adjustment period from the single file for presentation to the display device.

6. The television receiver for synchronizing electronic programming guide information with playback of the television program recording of claim 5, wherein the processor-readable instructions, when executed, further cause the one or more processors to:
   during output of content during the front-end adjustment period, output for presentation EPG information associated with the second television program, while not outputting EPG information associated with the first television program, wherein output of the EPG information associated with the second television program during the front-end adjustment period occurs before the second timeslot.

7. The television receiver for synchronizing electronic programming guide information with playback of the television program recording of claim 6, wherein the content output during the front-end adjustment period corresponds to the first television program.

8. The television receiver for synchronizing electronic programming guide information with playback of the television program recording of claim 1, wherein output of the EPG information associated with the first television program during output of the content during the back-end adjustment period occurs during the second timeslot while the second television program is being output for presentation.

9. The television receiver for synchronizing electronic programming guide information with playback of the television program recording of claim 1, wherein the processor-readable instructions, when executed, further cause the one or more processors to:
receive, via the one or more tuners, the EPG information for each television program of the plurality of the consecutively broadcast television programs.

10. A method for synchronizing electronic programming guide information with playback of a television program recording, the method comprising:
recording, by a television receiver, a plurality of consecutively broadcast television programs to a single file, wherein:
the plurality of consecutively broadcast television programs comprises a first television program and a second television program, and
the second television program was recorded to the single file from a second timeslot immediately following a first timeslot of the first television program;
after recording the plurality of consecutively broadcast television programs to the single file, receiving, by the television receiver, input requesting the recorded first television program be output for presentation;
determining, by the television receiver, a back-end adjustment period for playback of the first television program from the single file, wherein the back-end adjustment period immediately follows a scheduled end time of the first television program, the scheduled end time of the first television program being based on stored electronic programming guide information;
in response to the input requesting the first television program be output for presentation, outputting, by the television receiver, content from the single file for presentation to a display device concluding with the back-end adjustment period; and
while outputting content from during the back-end adjustment period, outputting, by the television receiver, for presentation, electronic programming guide (EPG) information associated with the first television program, while not outputting electronic programming guide information associated with the second television program.

11. The method for synchronizing electronic programming guide information with playback of the television program recording of claim 10, the method comprising:
receiving, via a tuner of the television receiver, an indication of a duration to use as the back-end adjustment period.

12. The method for synchronizing electronic programming guide information with playback of the television program recording of claim 10, the method comprising:
receiving, by the television receiver, via user input, an indication of a duration to use as the back-end adjustment period.

13. The method for synchronizing electronic programming guide information with playback of the television program recording of claim 10, wherein the electronic programming guide information associated with the first television program that is output for presentation comprises a title of the first television program.

14. The method for synchronizing electronic programming guide information with playback of the television program recording of claim 10, further comprising:
determining, by the television receiver, a front-end adjustment period for playback of the second television program from the single file, wherein the front-end adjustment period immediately precedes a scheduled start time of the second timeslot for the second television program, the scheduled start time of the second timeslot being based on the electronic programming guide information for the second television program; and
outputting, by the television receiver, content corresponding to the front-end adjustment period from the single file for presentation to the display device.

15. The method for synchronizing electronic programming guide information with playback of the television program recording of claim 14, further comprising:
during output of content during the front-end adjustment period, outputting, by the television receiver, for presentation, EPG information associated with the second television program, while not outputting EPG information associated with the first television program, wherein output of the EPG information associated with the second television program during the front-end adjustment period occurs before the second timeslot.

16. The method for synchronizing electronic programming guide information with playback of the television program recording of claim 15, wherein the content output during the front-end adjustment period corresponds to the first television program.

17. The method for synchronizing electronic programming guide information with playback of the television program recording of claim 10, wherein outputting the EPG information associated with the first television program during output of the content during the back-end adjustment period occurs during the second timeslot.

18. The method for synchronizing electronic programming guide information with playback of the television program recording of claim 17, wherein outputting the EPG information associated with the first television program during output of the content during the back-end adjustment period occurs while the second television program is being output for presentation.

19. The method for synchronizing electronic programming guide information with playback of the television program recording of claim 10, the method comprising:
receiving, by a tuner of the television receiver, the EPG information for each television program of the plurality of the consecutively broadcast television programs.

20. A non-transitory processor-readable medium that synchronizes electronic programming guide information with playback of a television program recording, comprising processor-readable instructions configured to cause one or more processors to:

record a plurality of consecutively broadcast television programs to a single file, wherein:
the plurality of consecutively broadcast television programs comprises a first television program and a second television program, and
the second television program was recorded to the single file from a second timeslot immediately following a first timeslot of the first television program;
after recording the plurality of consecutively broadcast television programs to the single file, receive input requesting the recorded second television program be output for presentation;
determine a back-end adjustment period for playback of the second television program from the single file, wherein the back-end adjustment period immediately follows a scheduled end time of the first television program, the scheduled end time of the first television program being based on stored electronic programming guide information;
in response to the input requesting the first television program be output for presentation, output content from the single file for presentation to a display device concluding with the back-end adjustment period; and
while content from during the back-end adjustment period is being output, output for presentation electronic programming guide information associated with the first television program, while not outputting electronic programming guide information associated with the second television program.

* * * * *